Jan. 6, 1970 R. J. CONTRUCCI 3,487,515
INDEXABLE INSERT
Filed April 7, 1969

INVENTOR.
Raymond J. Contrucci
BY
Ralph Hanman
attorney

United States Patent Office 3,487,515
Patented Jan. 6, 1970

3,487,515
INDEXABLE INSERT

Raymond J. Contrucci, Rochester, Mich., assignor to Greenleaf Corporation, Pittsburgh, Pa., a corporation of Pennsylvania
Filed Apr. 7, 1969, Ser. No. 814,009
Int. Cl. B23p 15/28
U.S. Cl. 29—95                        4 Claims

ABSTRACT OF THE DISCLOSURE

An indexable polygonal insert having peripheral sides meeting at cutting points which may be indexed successively into cutting position and having top and bottom supporting surfaces each comprising an island spaced inward from the peripheral sides adjacent the cutting points and extending out to the peripheral sides intermediate the cutting points to increase the stability of support for the insert. The space between the island and the peripheral sides is used for chip control or to provide a positive rake cutting edge or for both.

---

This invention is intended to provide indexable bits having better support. In a preferred form, the support comprises an island spaced inward from the peripheral edges of the bit in the active cutting area while extending out to the peripheral edges outside the active area so as to increase the stability of support.

Figure 1:
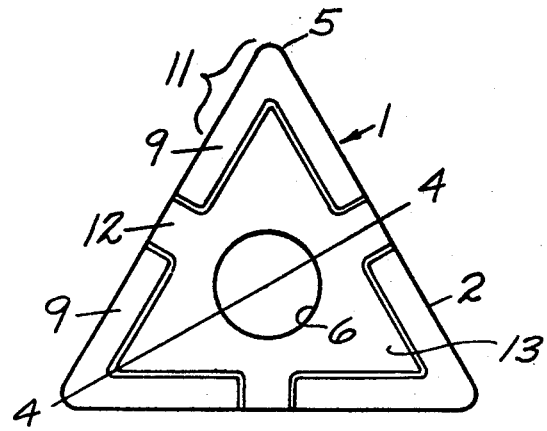
Figure 3:
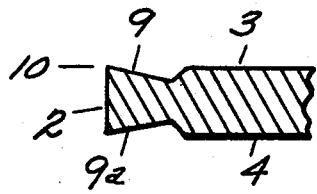
Figure 2:
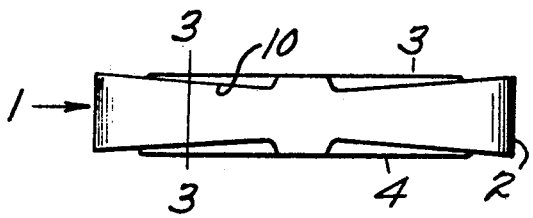
Figure 4:
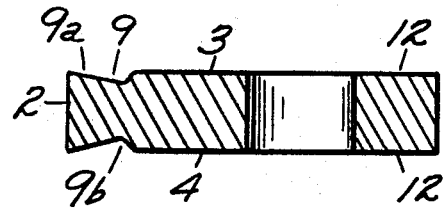
Figure 5:
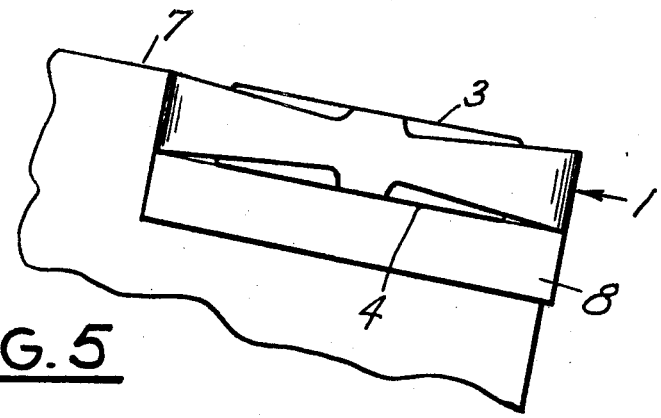

In the drawing, FIG. 1 is a top plan view of an indexable bit, FIG. 2 is an edge view, FIG. 3 is a section on line 3—3 of FIG. 2, FIG. 4 is a section on line 4—4 of FIG. 1, and FIG. 5 is a side elevation of the bit mounted on a negative rake holder.

The bit 1 is a regular polygon having peripheral sides or edges 2 at right angles to top and bottom end faces 3 and 4. Adjacent sides 2 meet to provide cutting points 5 which may successively be brought into cutting position by indexing the bit. At the center of the bit is a hole 6 for a pin by which the bit may be mounted on a holder 7. Typically, the holder has an anvil 8 on which the bottom surface 4 of the bit is seated and also has edge seats (not shown) for engaging the sides or edges 2 of the bit to locate the cutting point. When positioned on the anvil, the bit is clamped in place by suitable means (not shown). The parts so far described constitute a negative rake bit and holder and are or may be of common construction.

Grooves 9 extend lengthwise from each of the cutting points 5 at a positive rake angle relative to the top and bottom surfaces 3, 4. The intersection of the grooves 9 with the peripheral edge faces 2 provides cutting edges 10 which likewise extend lengthwise from each of the cutting points 5 at a positive rake angle relative to the top and bottom surfaces 3, 4. The length of the grooves 9 is greater than the active cutting area of the cutting edges 10 indicated at 11 but is less than half the length of the peripheral sides of the bit so that between grooves 9 there are extensions 12 which are in the plane of the top and bottom surfaces 3, 4. These extensions 12 are outboard of the central portion of the top and bottom surfaces and increase the stability of support of the bit when mounted, for example, on the anvil 8 of the holder 7.

The width and crosswise shape of the grooves 9 is determined by the desired cutting edge and chip control function. As shown in FIGS. 3 and 4, the grooves 9 have angular sides 9a intersecting the peripheral edges 2 at a positive rake angle and have steep or abrupt sides 9b intersecting the top and bottom surfaces 3, 4. Instead of the relatively simple shape shown in FIGS. 3 and 4, more complex shapes may be used. Also, the shape of the groove may vary along its length. It is sometimes desirable to have a different shape adjacent the cutting point to provide chip control for shallow cuts than at points remote from the point where the groove may be shaped to control the chips for heavier cuts. Also, instead of the grooves 9 forming cutting edges 10 by direct intersection with the peripheral edges of the bit, in some cases a narrow land is provided between the groove 9 and the adjacent peripheral edge.

In either top or bottom plan view, the bit has an island 13 spaced inward from the cutting edges 10 at the cutting points and throughout the active cutting areas 11 with extensions 12 extending out to the peripheral edges 2 so as to provide stable support for the bit. The cutting points 5 may be in the planes of the islands 13 but are usually spaced slightly below the planes of the islands. The bits may be mounted on any negative rake holder and when so mounted may be indexed to bring cutting points into active cutting position and may also be inverted so as to bring other cutting points into cutting position.

What is claimed is:
1. A polygonal bit having peripheral sides meeting at cutting points which may be indexed successively into cutting position and having top and bottom end supporting surfaces each comprising an island spaced inward from the peripheral sides adjacent the cutting points and extending to the peripheral sides intermediate the cutting points whereby the islands have outward extensions for increasing the stability of support for the bit.

2. The bit of claim 1 having cutting edges adjacent the peripheral sides extending lengthwise at a positive rake angle relative to the adjacent end supporting surface from the cutting points toward the extensions of the islands.

3. The bit of claim 2 having grooves in the spaces between the island and the cutting edges extending lengthwise along the cutting edges at a positive rake angle relative to the adjacent end supporting surface from the cutting points toward the extensions of the islands.

4. The bit of claim 3 in which the grooves extend in a crosswise direction from the cutting edges at a positive rake angle relative to the adjacent end supporting surface.

References Cited

UNITED STATES PATENTS

| | | | |
|---|---|---|---|
| 2,870,523 | 1/1959 | Richard | 29—96 |
| 3,187,406 | 6/1965 | Franko | 29—95 |
| 3,188,717 | 6/1965 | Heinlein | 29—96 |
| 3,279,034 | 10/1966 | Kaiser | 29—95 |
| 3,279,035 | 10/1966 | Johnson | 29—95 |
| 3,434,190 | 3/1969 | Kaiser | 29—95 |

HARRISON L. HINSON, Primary Examiner